US012038158B2

(12) United States Patent
Gall et al.

(10) Patent No.: US 12,038,158 B2
(45) Date of Patent: Jul. 16, 2024

(54) HIGH VISIBILITY HEADLAMP

(71) Applicant: MILWAUKEE ELECTRIC TOOL CORPORATION, Brookfield, WI (US)

(72) Inventors: Benjamin D. Gall, Milwaukee, WI (US); Sara M. Manulik, Milwaukee, WI (US); Alan Amundson, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/135,276

(22) Filed: Apr. 17, 2023

(65) Prior Publication Data

US 2023/0250942 A1 Aug. 10, 2023

Related U.S. Application Data

(63) Continuation of application No. 17/567,642, filed on Jan. 3, 2022, now Pat. No. 11,655,969, which is a (Continued)

(51) Int. Cl.
*F21V 21/084* (2006.01)
*F21L 4/04* (2006.01)
(Continued)

(52) U.S. Cl.
CPC .............. *F21V 21/084* (2013.01); *F21L 4/04* (2013.01); *F21V 21/0816* (2013.01);
(Continued)

(58) Field of Classification Search
CPC .. F21V 21/084; F21V 21/0816; F21V 23/002; F21L 4/04; F21Y 2113/13; F21Y 2115/10; H05B 47/10
See application file for complete search history.

(56) References Cited

U.S. PATENT DOCUMENTS 1,901,180 A 3/1933 McBride
2,705,751 A 4/1955 Harris et al.
(Continued)

FOREIGN PATENT DOCUMENTS

CN 2412144 Y 12/2000
CN 202972581 U 6/2013
(Continued)

OTHER PUBLICATIONS

International Search Report and Written Opinion for Application No. PCT/US2020/016164 dated Jun. 1, 2020 (8 pages).
(Continued)

*Primary Examiner* — Joseph L Williams
(74) *Attorney, Agent, or Firm* — Michael Best & Friedrich LLP

(57) ABSTRACT

A headlamp includes a strap, a bracket coupled to the strap, and a first lighting assembly pivotally coupled to the bracket and including a first light housing enclosing a first LED, a battery housing enclosing a battery configured to power the first LED, and a first actuator operable to toggle the first lighting assembly between a first plurality of operating modes. The headlamp also includes a second lighting assembly coupled to the strap and having a plurality of second LEDs and a second actuator operable to toggle the second lighting assembly between a second plurality of operating modes such that the lighting assemblies are operable independently. A wire extends between the lighting assemblies to provide power from the battery to the plurality of second LEDs. The second lighting assembly extends along more than 50% of a circumference of the strap and follows a curvature of the strap.

18 Claims, 13 Drawing Sheets

Related U.S. Application Data continuation of application No. 17/197,868, filed on Mar. 10, 2021, now Pat. No. 11,215,343, which is a continuation of application No. 17/087,025, filed on Nov. 2, 2020, now Pat. No. 10,948,171, which is a continuation of application No. 16/778,823, filed on Jan. 31, 2020, now Pat. No. 10,859,245.

(60) Provisional application No. 62/799,926, filed on Feb. 1, 2019.

(51) Int. Cl.
*F21V 21/08* (2006.01)
*H05B 47/10* (2020.01)
*F21Y 113/13* (2016.01)
*F21Y 115/10* (2016.01)

(52) U.S. Cl.
CPC .......... *H05B 47/10* (2020.01); *F21Y 2113/13* (2016.08); *F21Y 2115/10* (2016.08)

(56) References Cited

U.S. PATENT DOCUMENTS

| | | | |
|---|---|---|---|
| 3,590,232 | A | 6/1971 | Sadowski |
| 4,559,586 | A | 12/1985 | Slarve |
| 4,901,210 | A | 2/1990 | Hanabusa |
| 4,945,458 | A | 7/1990 | Batts et al. |
| 4,987,433 | A | 1/1991 | Gandrud |
| 5,040,099 | A | 8/1991 | Harris |
| 5,329,637 | A | 7/1994 | Walker |
| 5,688,039 | A | 11/1997 | Johnson |
| 5,931,559 | A | 8/1999 | Pfaeffle |
| 6,113,244 | A | 9/2000 | Baumgartner |
| 6,439,733 | B1 | 8/2002 | Fischer et al. |
| 6,648,489 | B2 | 11/2003 | Fischer et al. |
| 6,752,510 | B1 | 6/2004 | Appiah |
| 7,075,250 | B2 | 7/2006 | Colwell |
| 7,147,338 | B2 | 12/2006 | Gregg |
| 7,304,442 | B2 | 12/2007 | Colwell |
| 7,901,104 | B2 | 3/2011 | McLean et al. |
| 7,942,543 | B2 | 5/2011 | Ritter |
| 8,025,432 | B2 | 9/2011 | Wainwright |
| 8,070,307 | B2 | 12/2011 | Ho |
| 8,070,308 | B1 | 12/2011 | Lo et al. |
| 8,113,677 | B2 | 2/2012 | Carpenter |
| 8,157,402 | B2 | 4/2012 | Huss et al. |
| 8,186,021 | B2 | 5/2012 | Gonzalez |
| 8,350,486 | B2 | 1/2013 | Bucalo |
| 8,529,082 | B1 | 9/2013 | Baker et al. |
| 8,733,989 | B1 | 5/2014 | Lo et al. |
| 8,807,778 | B1 | 8/2014 | Latchman et al. |
| 9,060,558 | B2 | 6/2015 | Dorman |
| 9,080,764 | B2 | 7/2015 | Gonzalez |
| 9,103,539 | B2 | 8/2015 | Baker et al. |
| 9,271,343 | B2 | 2/2016 | Mackool et al. |
| 9,451,801 | B2 | 9/2016 | Bryan et al. |
| 9,737,105 | B2 | 8/2017 | Baker et al. |
| 9,829,182 | B1 | 11/2017 | McCaslin et al. |
| 9,986,778 | B2 | 6/2018 | Baker et al. |
| 10,362,827 | B2 | 7/2019 | Bryan et al. |
| 10,561,188 | B2 | 2/2020 | Baker et al. |
| 11,215,343 | B2 | 1/2022 | Gall et al. |
| 2008/0004510 | A1 | 1/2008 | Tanzawa et al. |
| 2010/0128468 | A1 | 5/2010 | Ong et al. |
| 2011/0145978 | A1 | 6/2011 | Harbin |
| 2011/0289658 | A1 | 12/2011 | Knoepfli et al. |
| 2012/0224356 | A1 | 9/2012 | Fischer et al. |
| 2013/0201664 | A1 | 3/2013 | Harooni |
| 2013/0174323 | A1 | 7/2013 | McFall |
| 2014/0146552 | A1 | 5/2014 | Hui |
| 2015/0327615 | A1 | 11/2015 | Gelb |
| 2016/0150844 | A1 | 6/2016 | Das |
| 2017/0023189 | A1 | 1/2017 | Keisling et al. |
| 2017/0119078 | A1 | 5/2017 | Chen et al. |
| 2017/0276856 | A1 | 9/2017 | Gagneux |
| 2017/0318880 | A1* | 11/2017 | Tiffin ............... A41D 19/01547 |
| 2018/0000182 | A1 | 1/2018 | Baker et al. |
| 2018/0058669 | A1 | 3/2018 | Berrel et al. |
| 2018/0303186 | A1 | 10/2018 | Baker et al. |
| 2019/0254376 | A1 | 8/2019 | Baker et al. |

FOREIGN PATENT DOCUMENTS

| | | | |
|---|---|---|---|
| CN | 104832796 | A | 8/2015 |
| CN | 204763607 | U | 11/2015 |
| CN | 106287306 | A | 1/2017 |
| CN | 206846378 | U | 1/2018 |
| CN | 108286668 | A | 7/2018 |
| DE | 29718173 | U1 | 1/1998 |
| DE | 20017922 | U1 | 1/2001 |
| DE | 20319297 | U1 | 2/2004 |
| DE | 20319126 | U1 | 5/2005 |
| DE | 202009000140 | U1 | 3/2009 |
| GB | 2499433 | A | 8/2013 |
| JP | H08202282 | A | 8/1996 |
| JP | 2003295306 | A | 10/2003 |
| JP | 2008223167 | A | 9/2008 |
| JP | 2011111683 | A | 6/2011 |
| WO | 2009143791 | A1 | 12/2009 |
| WO | 2017051371 | A1 | 3/2017 |
| WO | 2017055804 | A1 | 4/2017 |

OTHER PUBLICATIONS

Partial Supplementary European Search Report for Application No. 20747689.6 dated Aug. 18, 2022 (14 pages).
Extended European Search Report for Application No. 20747689.6 dated Nov. 18, 2022 (12 pages).

* cited by examiner

HIGH VISIBILITY HEADLAMP

CROSS-REFERENCE TO RELATED APPLICATIONS

This application is a continuation of U.S. patent application Ser. No. 17/567,642, filed Jan. 3, 2022, now U.S. Pat. No. 11,655,969, which is a continuation of U.S. patent application Ser. No. 17/197,868, filed Mar. 10, 2021, now U.S. Pat. No. 11,215,343, which is a continuation of U.S. patent application Ser. No. 17/087,025, filed Nov. 2, 2020, now U.S. Pat. No. 10,948,171, which is a continuation of U.S. patent application Ser. No. 16/778,823, filed Jan. 31, 2020, now U.S. Pat. No. 10,859,245, which claims priority to U.S. Provisional Patent Application No. 62/799,926, filed Feb. 1, 2019, the entire contents of all of which are incorporated by reference herein.

FIELD OF THE INVENTION

The present invention relates to portable lights and, more particularly, to headlamps.

BACKGROUND

Construction workers, bicyclists, runners, etc. may wear headlamps order to see in low-light conditions while keeping their hands free. It may also be desirable to increase the visibility of these individuals to others (e.g., passing motorists, equipment operators, etc.).

SUMMARY

In one aspect, the invention provides a headlamp including a strap, a bracket coupled to the strap, and a first lighting assembly pivotally coupled to the bracket. The first lighting assembly includes a first light housing enclosing a first LED, a battery housing enclosing a battery, the battery configured to provide power to the first LED, and a first actuator operable to toggle the first lighting assembly between a first plurality of operating modes. The headlamp also includes a second lighting assembly coupled to the strap. The second lighting assembly includes a plurality of second LEDs and a second actuator operable to toggle the second lighting assembly between a second plurality of operating modes such that the second lighting assembly is operable independently of the first lighting assembly. The headlamp also includes a wire extending between the first lighting assembly and the second lighting assembly and configured to provide power from the battery to the plurality of second LEDs. The second lighting assembly extends along more than 50% of a circumference of the strap, and the second lighting assembly follows a curvature of the strap.

In another aspect, the invention provides a headlamp including a strap, a bracket coupled to the strap, and a first lighting assembly pivotally coupled to the bracket. The first lighting assembly includes a first light housing enclosing a first LED, a battery housing enclosing a battery, the battery configured to provide power to the first LED, and a first actuator operable to toggle the first lighting assembly between a first plurality of operating modes including a high intensity mode, a low intensity mode, and a flashing mode. The headlamp also includes a second lighting assembly coupled to the strap. The second lighting assembly includes a plurality of second LEDs and a second actuator operable to toggle the second lighting assembly between a second plurality of operating modes such that the second lighting assembly is operable independently of the first lighting assembly. A wire extends between the first lighting assembly and the second lighting assembly, and the wire is configured to provide power from the battery to the plurality of second LEDs. The wire includes coils to permit expansion and contraction of the wire. The first LED and the plurality of second LEDs are configured to emit white light. The second lighting assembly extends along more than 50% of a circumference of the strap, and the second lighting assembly is configured to distribute light at least partially around the circumference of the strap to increase visibility of a wearer of the headlamp from multiple directions.

In another aspect, the invention provides a headlamp including a strap configured to be worn over a hard hat, a bracket coupled to the strap, and a first lighting assembly pivotally coupled to the bracket. The first lighting assembly includes a first light housing enclosing a first LED, a battery housing enclosing a battery, the battery configured to provide power to the first LED, and a first actuator operable to toggle the first lighting assembly between a first plurality of operating modes including a high intensity mode, a low intensity mode, and a flashing mode. The headlamp also includes a second lighting assembly coupled to the strap by a plurality of couplers such that the second lighting assembly follows a curvature of the strap. The second lighting assembly includes a plurality of second LEDs and a second actuator operable to toggle the second lighting assembly between a second plurality of operating modes such that the second lighting assembly is operable independently of the first lighting assembly. A wire extends between the first lighting assembly and the second lighting assembly. The wire is configured to provide power from the battery to the plurality of second LEDs, and the wire includes coils to permit expansion and contraction of the wire. The first LED and the plurality of second LEDs are configured to emit white light, and the second lighting assembly is configured to distribute light at least partially around the circumference of the strap to increase visibility of a wearer of the headlamp from multiple directions.

Other features and aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
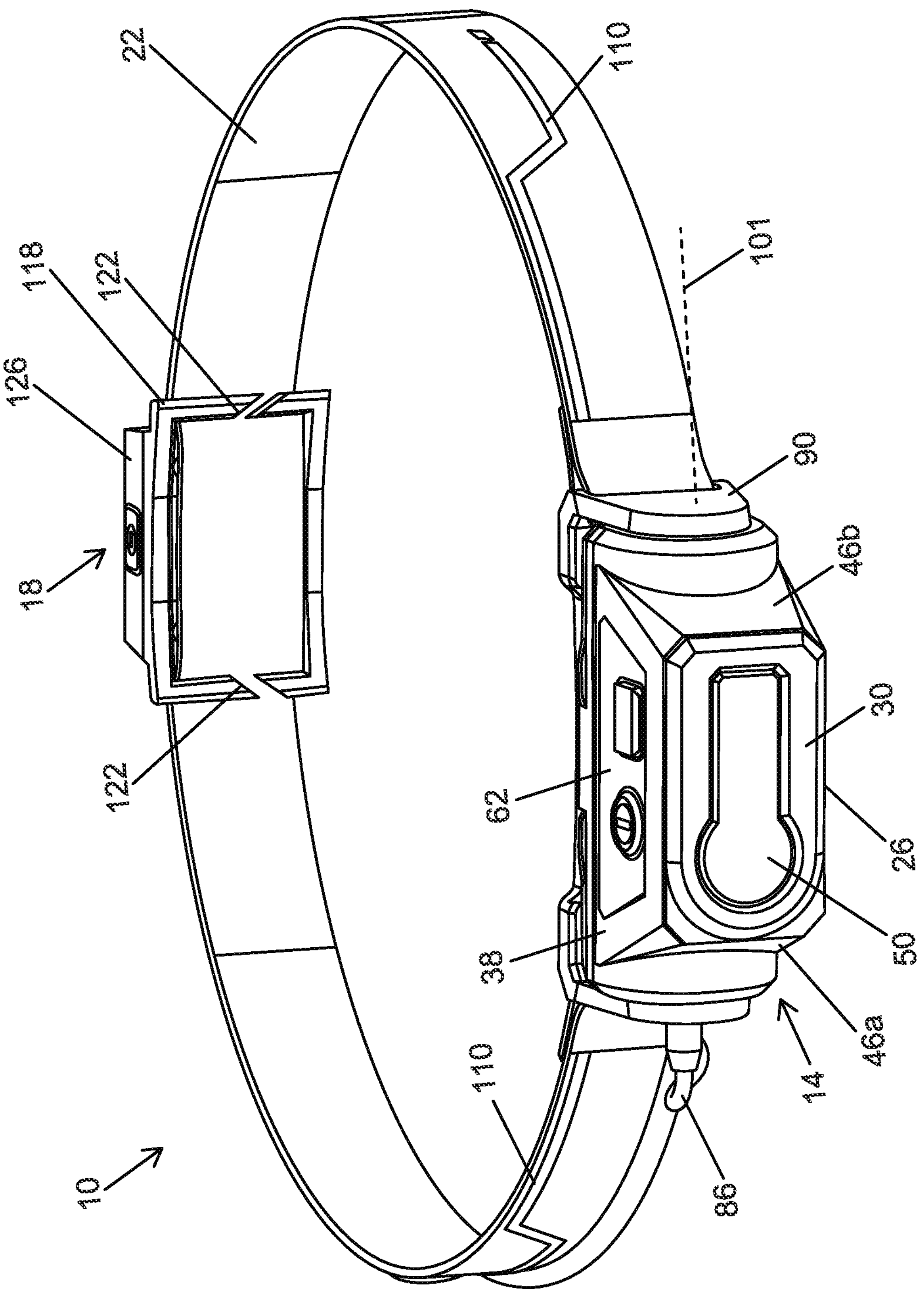
FIG. 1 is a front perspective view of headlamp according to one embodiment.
Figure 2:
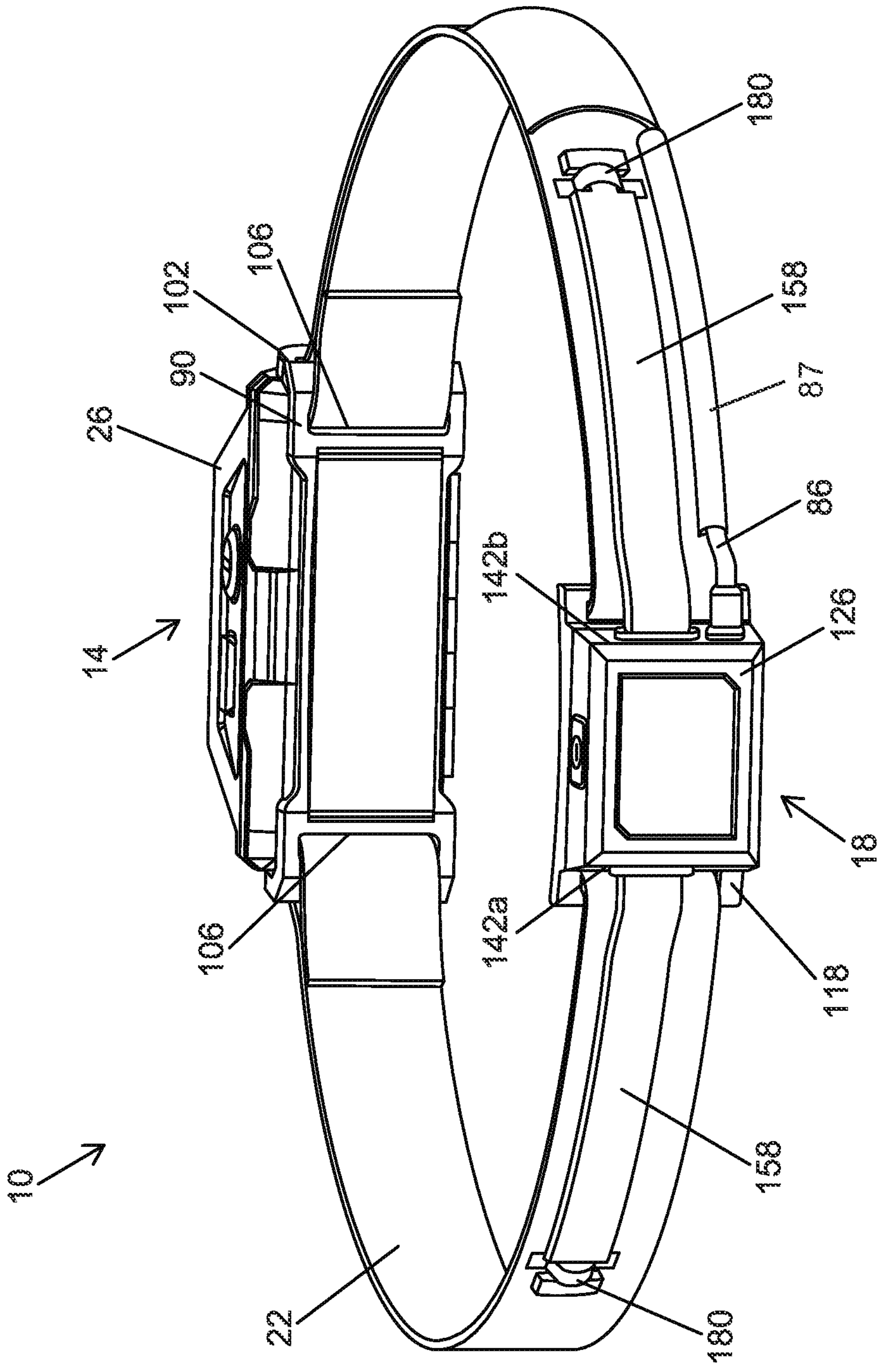
FIG. 2 is a rear perspective view of the headlamp of FIG. 1.
Figure 3:
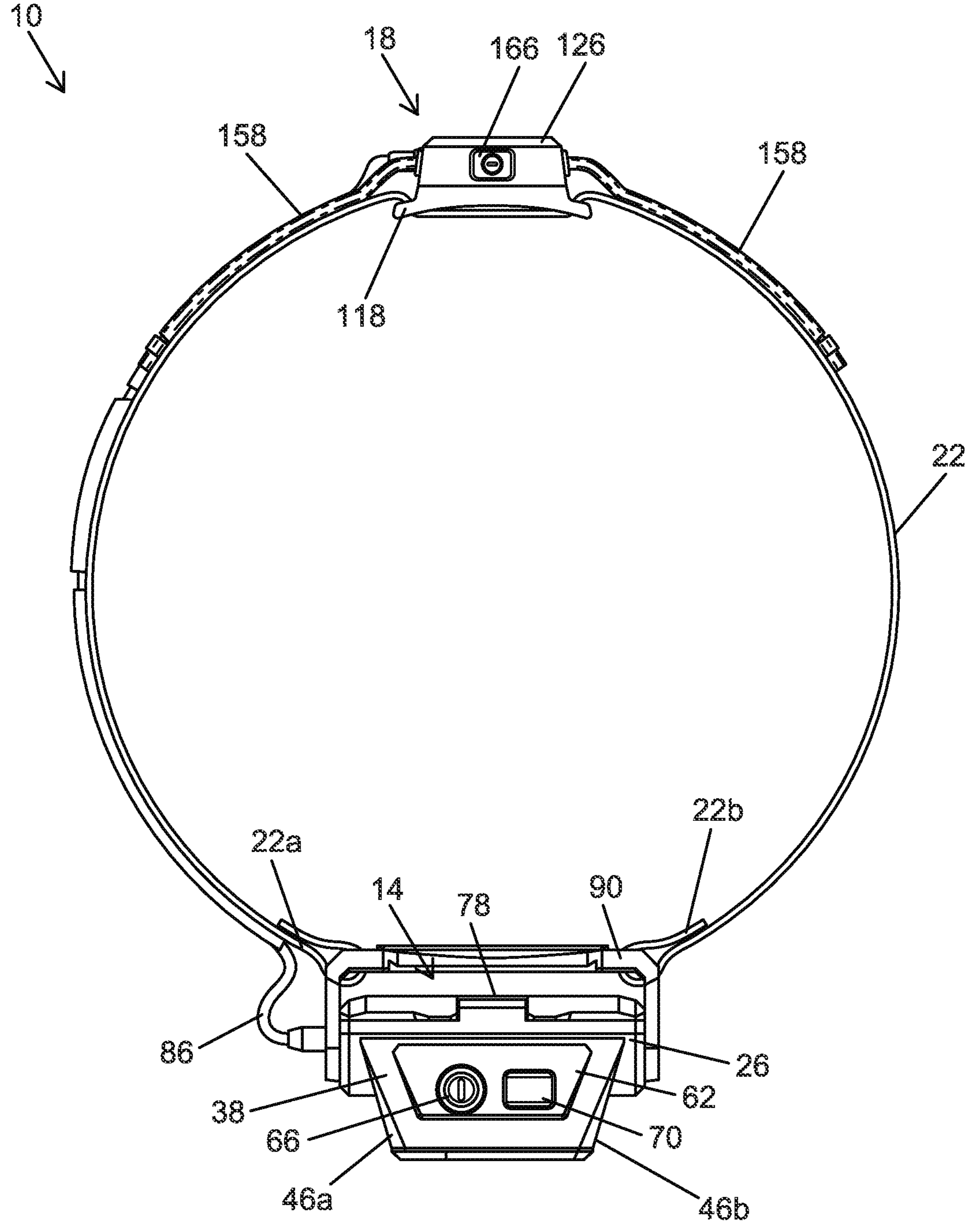
FIG. 3 is a top view of the headlamp of FIG. 1.

FIG. 1 illustrates a high visibility headlamp 10 according to one embodiment. The illustrated headlamp 10 may be secured to a user's head, allowing for hands-free illumination. The headlamp 10 includes a first lighting assembly or front light assembly 14, a second lighting assembly or rear light assembly 18, and a strap 22 extending between and interconnecting the front and rear light assemblies 14, 18 (FIGS. 1-3). When the headlamp 10 is worn by the user, the front light assembly 14 is preferably positioned adjacent the user's forehead, and the rear light assembly 18 is preferably positioned adjacent the back of the user's head. Accordingly, the front light assembly 14 may emit light in a direction generally forward of the user, and the rear light assembly 18 may emit light in a direction generally rearward of the user.

Figure 4:
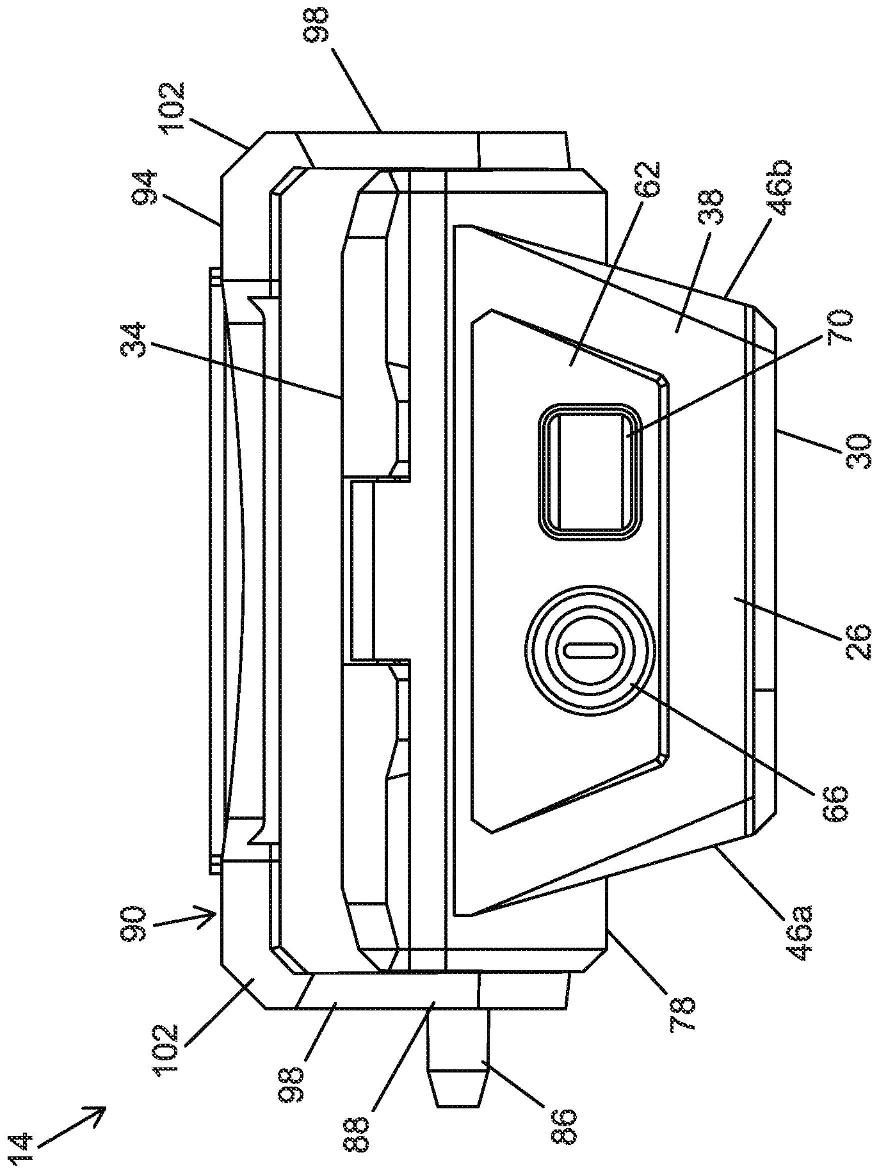
FIG. 4 is a top view of a front light assembly of the headlamp of FIG. 1.
Figure 5:
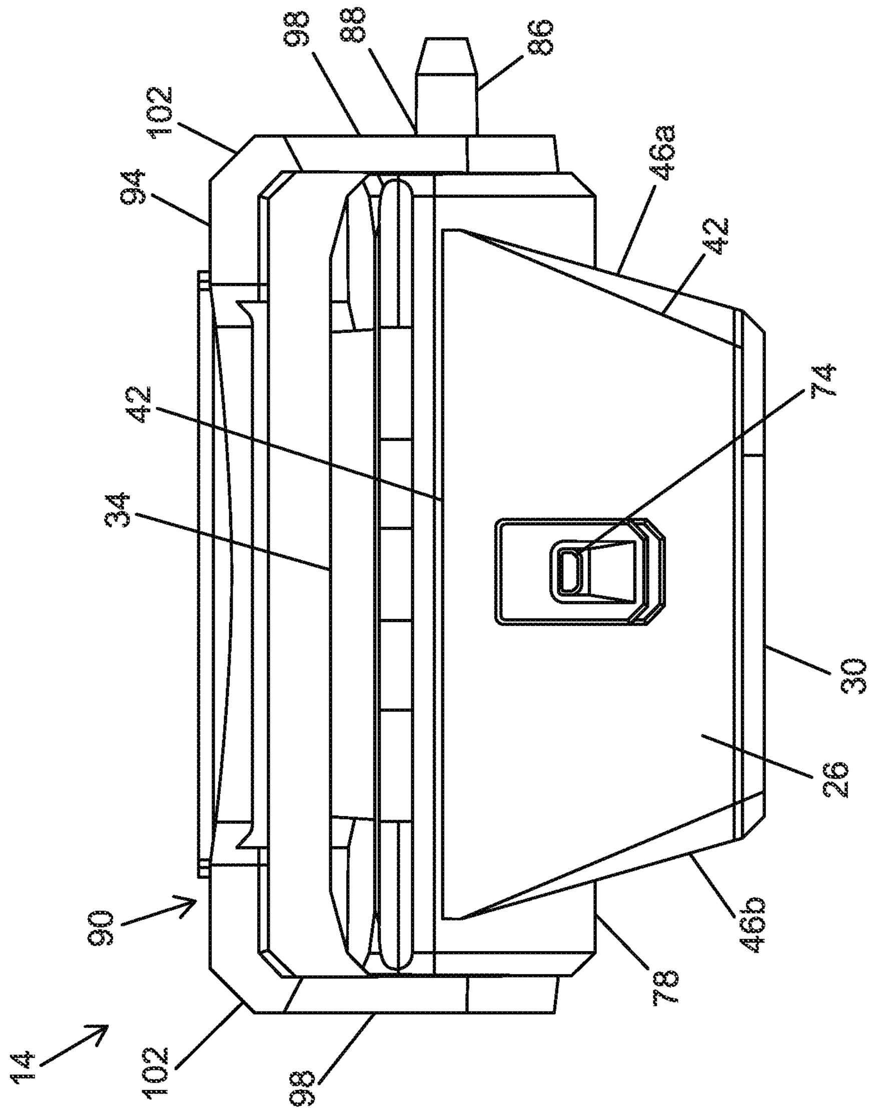
FIG. 5 is a bottom view of the front light assembly of FIG. 4.

Referring to FIGS. 4 and 5, the illustrated front light assembly 14 includes a first light housing or front light housing 26. The front light housing 26 has a front face 30, a back face 34 opposite the front face 30, a top face 38 (FIG. 4), a bottom face 42 (FIG. 5) opposite the top face 38, and two side faces 46*a*, 46*b* that extend between the top face 38 and the bottom face 42. In the illustrated embodiment, the side faces 46*a*, 46*b* are angled to converge in a direction from the back face 34 toward the front face 30, such that at least a portion of the front light housing 26 including the side faces 46*a*, 46*b* is shaped as a trapezoidal prism.

Figure 7:
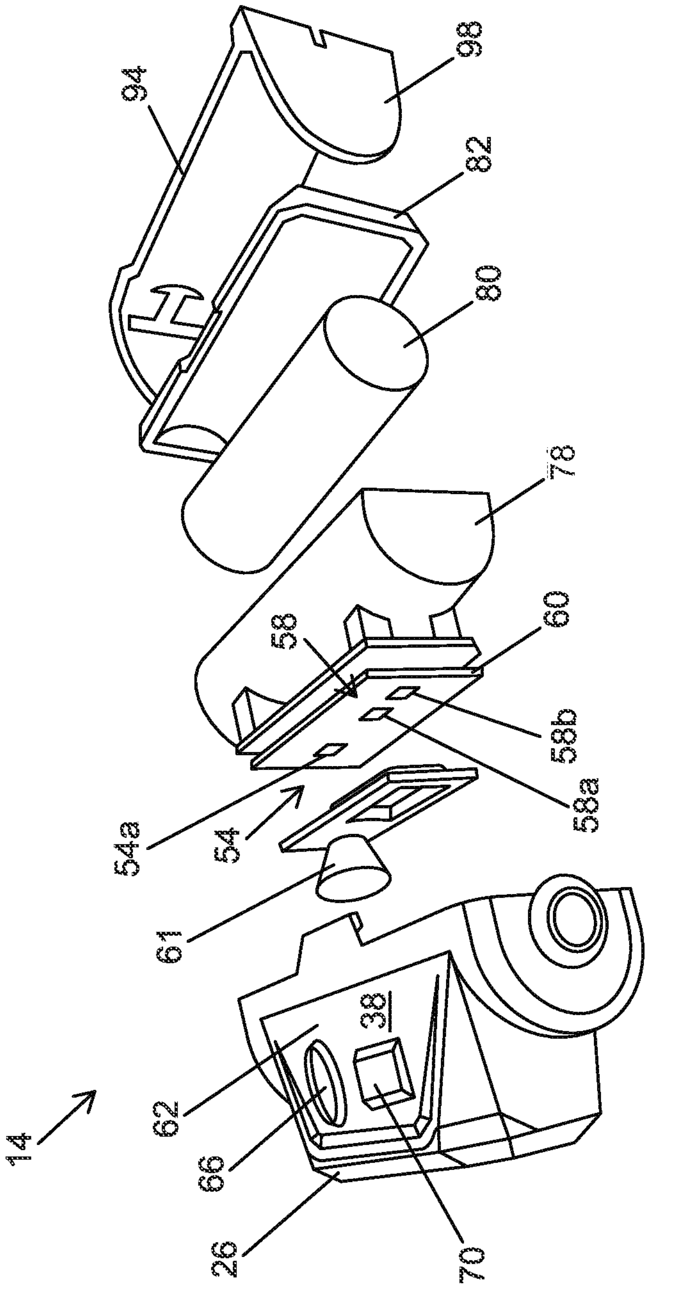
FIG. 7 is an exploded view of the front light assembly of FIG. 4.
Figure 8:
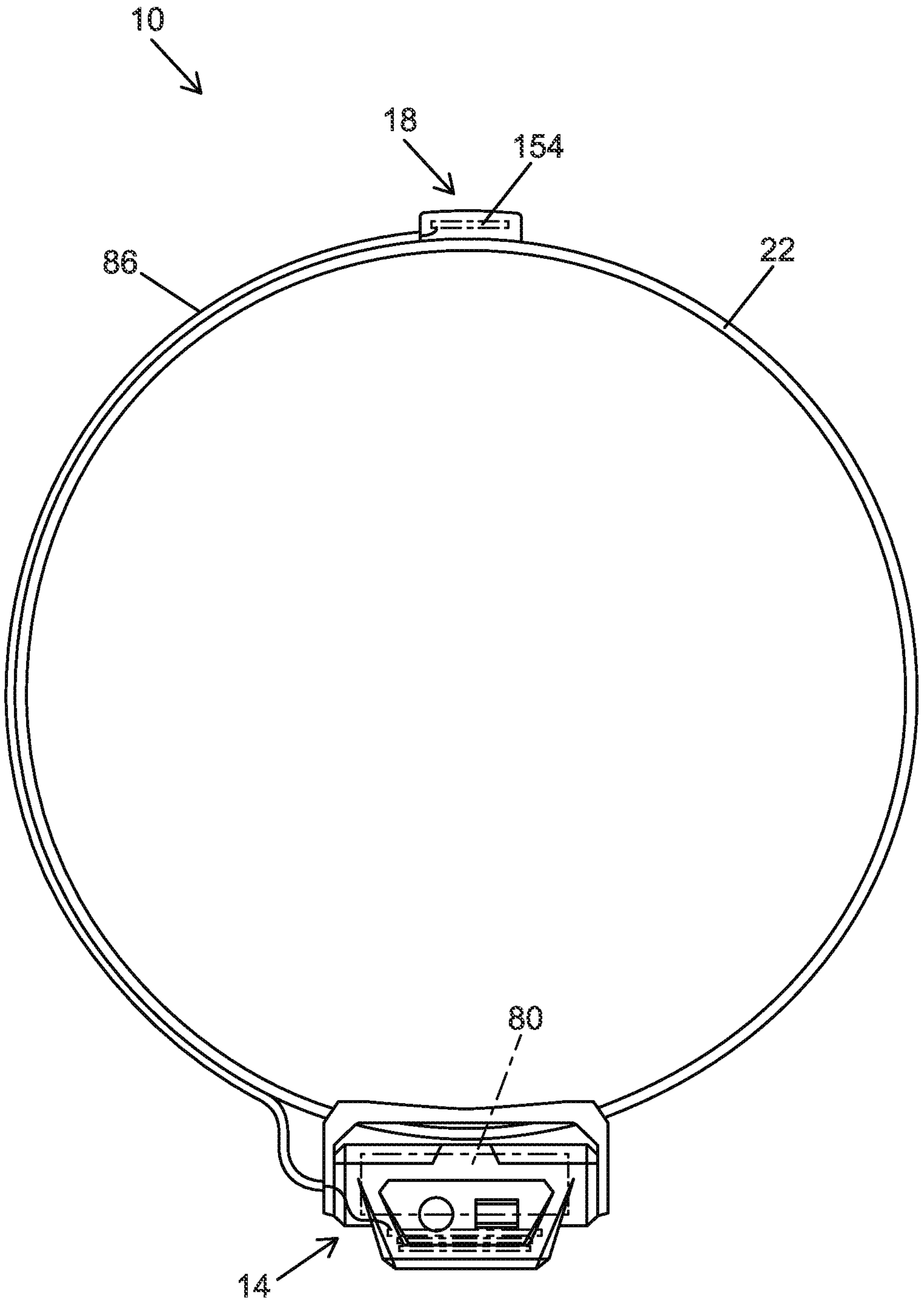
FIG. 8 is a cutaway top view of the headlamp of FIG. 1.

The front face 30 has a beveled contour that supports a lens 50 (FIG. 1). The lens 50 is positioned in front of a front light source, which in the illustrated embodiment includes a first light source 54 and a second light source 58 at least partially enclosed within the front light housing 26 (FIG. 7). In some embodiments, the first light source 54 and the second light source 58 may be entirely enclosed by the front light housing 26. Additionally or alternatively, the front light source may include a single light source or may include more than two light sources. In addition to protecting the light sources 54, 58, the lens 50 may also diffuse light emitted by the first and second light sources 54, 58 to the surrounding area. In other embodiments, the lens 50 may focus or collimate light from one or both of the light sources 54, 58. In yet other embodiments, the lens 50 may not substantially alter the light emitted by the light sources 54, 58.

With continued reference to FIG. 7, in the illustrated embodiment, the first and second light sources 54, 58 each include one or more light emitting diodes (LEDs). In particular, the first light source 54 includes a first LED 54*a*, and the second light source 58 includes first and second LEDs 58*a*, 58*b*. The LEDs 54*a*, 58*a*, 58*b* are preferably white LEDs and are each mounted to a common printed circuit board (PCB) 60. In other embodiments, the first and second light sources 54, 58 may include any number or arrangement of LEDs, which may be mounted to one or more PCBs. A spotlight reflector 61 is positioned in front of the first light source 54 to direct light emitted by the first light source 54 in a specific direction to form a relatively concentrated beam of light (i.e., a relatively narrow beam angle). The second light source 58 emits less concentrated light over a wider area (i.e., a relatively wider beam angle). Thus, the illustrated front light assembly 14 is usable as a spotlight when the first light source 54 is illuminated, and as a floodlight when the second light source 58 is illuminated. In other embodiments, other suitable light sources may also or alternatively be employed.

A control panel 62 is provided to control the front light assembly 14 (e.g., to turn the light sources 54, 58 ON and OFF using a power actuator 66, and to change an operating mode of the light sources 54, 58 using a mode actuator 70). The power and mode actuators 66, 70 are pushbuttons in the illustrated embodiment, but alternatively can include and combination of buttons, touch sensors, motion sensors, ambient light sensors, switches, or the like to control operation of the front light assembly 14. The mode actuator 70 may toggle the front light assembly 14 between a plurality of different modes. For example, in some embodiments, the front light assembly 14 may be operable in five different modes: a first mode in which both the first and second light sources 54, 58 emit light (e.g., a maximum brightness mode), a second mode in which the first light source 54 does not emit light and the second light source 58 emits light at a high intensity (e.g., a high flood mode), a third mode in which the first light source 54 does not emit light and the second light source 58 emits light at a medium intensity (e.g., a medium flood mode), a fourth mode in which the first light source 54 does not emit light and the second light source 58 emits light at a low intensity (e.g., a low flood mode), and a fifth mode in which the first light source 54 emits light at a high intensity and the second light source 58 does not emit light (e.g., a spot mode). In alternative embodiments, the front light assembly 14 may be operable in other modes, such as flashing or strobe modes, and/or in any combination or subset of the five modes. The user may cycle through modes (e.g., first, second, third, fourth, fifth modes) by repeatedly pressing the mode actuator 70. In other embodiments, the user may cycle through modes by pressing the mode actuator 70 in a predetermined pattern, holding down the mode actuator 70, or the like. In other embodiments, the mode actuator 70 may be omitted, and the user may cycle through modes by depressing the power actuator 66 in predetermined patterns (e.g., multiple short presses, etc.).

The headlamp 10 may include an internal control unit, including, for example a microprocessor and memory, capable of storing information and executing functions. The internal control unit is configured to store the operating mode of the front light assembly 14 (as set by the mode actuator 70) when the front light assembly 14 is powered ON and OFF by the power actuator 66. This results in a light that may be turned ON and OFF while maintaining the most recent state of the front light assembly 14 (e.g., the mode of the front light assembly 14), thereby allowing the user to turn the front light assembly 14 ON with the last setting without having to readjust the light 14.

The bottom face 42 of the illustrated front light housing 26 includes a charging port 74 (FIG. 5). The illustrated charging port 74 is configured as a USB port, although other suitable charging ports may also or alternatively be included on the front light assembly 14. The charging port 74 is electrically connected to a rechargeable battery 80 (FIG. 7). In the illustrated embodiment, the battery 80 is generally cylindrical and is at least partially accommodated within a battery housing 78 positioned behind the PCB 60. The battery housing 78 includes battery terminals (not shown) electrically coupled to the PCB 60 to provide power from the battery 80 to the light sources 54, 58. In some embodiments, the battery 80 may have a Li-ion chemistry.

The battery 80 is insertable and removable from the battery housing 78 by opening a battery cover 82, which may be pivotally coupled to the battery housing 78. Alternatively, the battery cover 82 may be coupled to the battery housing 78 in other ways. The battery 80 can be recharged via the charging port 74 without removing the battery 80 from the battery housing 78, or the battery 80 can be removed for charging and, optionally replaced by a similar battery 80 to allow for continued operation of the headlamp 10. In other embodiments, the battery 80 may not be removable from the housing. In yet other embodiments, the charging port 74 may be omitted, and the battery 80 may be a single-use battery (e.g., an alkaline battery).

Referring to FIG. 3, the illustrated headlamp 10 includes an electrical wire 86 extending between the front light assembly 14 and the rear light assembly 18. Specifically, the wire 86 transmits power from the battery 80 to the rear light assembly 18, allowing both the front and rear light assemblies 14, 18 to receive power from the battery 80. In other embodiments, the battery 80 may be housed within the rear light assembly 18, and the wire 86 may be configured to provide power from the rear light assembly 18 to the front light assembly 14. In the illustrated embodiment, the wire 86 is positioned on an exterior surface of the strap 22 (i.e., the surface facing away from a user). In other embodiments, the wire 86 may be positioned on an interior surface of the strip 22 (i.e., the surface facing toward a user). Alternatively, the user may be embedded within the strap 22 (e.g., positioned between two or more layers of material that form the strap 22).

With reference to FIGS. 4 and 5, the front light housing 26 is coupled to a bracket 90. A wire port 88, for receiving the wire 86, extends through the bracket 90 and into the housing 28. The bracket 90 is generally U-shaped and includes a back 94 and two generally semi-circular sides or flanges 98. The back 94 extends parallel to the back face 34 of the front light housing 26. The flanges 98 extend perpendicularly from beveled transition portions 102 disposed at opposite ends of the back 94. The front light housing 26 is sandwiched between and pivotally coupled to the flanges 98. The front light housing 26 is therefore pivotable relative to the bracket 90 about a pivot axis 101 (FIG. 1), to adjust the orientation of the front light housing 26 up or down. The wire port 88 is coaxial with the pivot axis 101 in the illustrated embodiment, such that the wire 86 is not moved up or down when pivoting the front light housing 26.

With reference to FIGS. 2-3, the bracket 90 includes two slots 106 extending through the bracket 90 adjacent the respective transition portions 102. The slots 106 are shaped to receive the strap 22 to couple the bracket 90 to the strap 22. In the illustrated embodiment, the strap 22 includes a first end **22*a* and a second end 22*b* coupled to the slots 106 of the bracket 90 by looping the ends 22*a*, 22*b* through the respective slots 106 and fastening the ends 22*a*, 22*b* to the body of the strap 22 (e.g., by stitching). In other embodiments, the strap 22 and the bracket 90 can be coupled together in other ways. When assembled with the headlamp 10, the strap 22 may define a ring shape (FIG. 3**).

Figure 10:
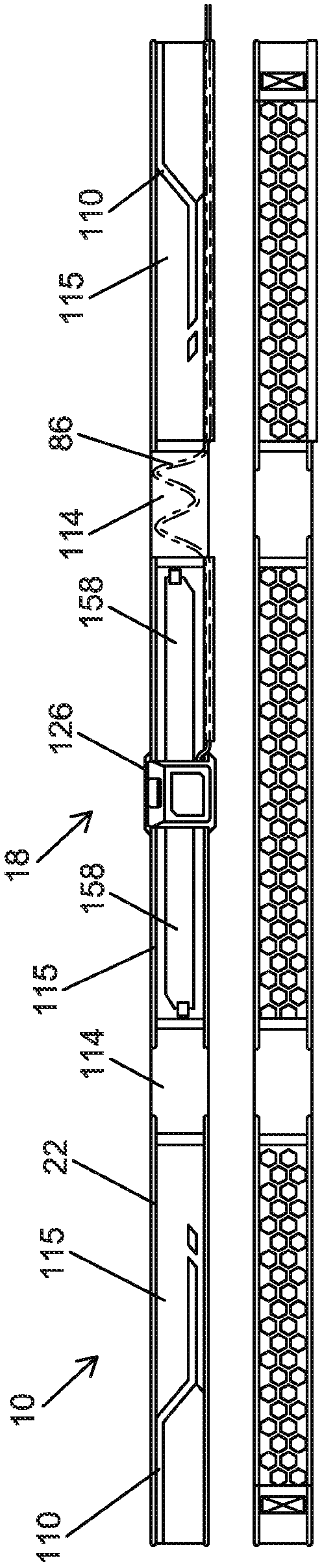
FIG. 10 is a plan view of a strap of the headlamp of FIG. 1.

The strap 22 may include one or more elastic or stretchable portions 114 and one or more inelastic or non-stretchable portions 115 (FIG. 10). The elastic portions 114 permit the strap 22 to be adjusted to different sizes by stretching the strap 22, allowing the headlamp 10 to be worn over a hard hat, helmet, or directly on a user's head, for example. In other embodiments, the strap 22 may include one or more strap adjusters to allow a user to vary the diameter of the strap 22. The strap 22 may include reflective material 110 (e.g., reflective tape, reflective paint, reflective printing, or the like) affixed to the exterior side of the strap 22 to enhance visibility of the user when wearing the headlamp 10. The reflective material 110 is preferably provided on non-stretchable portions of the strap 22 to inhibit wrinkling or tearing of the reflective material 110. The wire 86 may be woven into a bottom portion of the strap 22 to prevent the wire 86 from protruding or slipping. The wire 86 may be arranged in waves or coils where the wire 86 spans the elastic portions 114 of the strap 22 to permit expansion and contraction of the wire 86 with the strap 22 without straining the ends of the wire 86.

The rear light assembly 18 is coupled to the strap 22 at a position opposite the front light assembly 14 (FIGS. 1-3). The wire 86 extends along the strap 22 from the first side face **46*a* of the first light housing 26 to the rear light assembly 18. In some embodiments, the strap 22 includes a sleeve 87 (FIG. 2) extending along a bottom portion of the strap, and the wire extends through the sleeve 87. The rear light assembly 18 is coupled to the strap 22 via a connector portion 118. More specifically, the connector portion 118 includes two slots 122. The strap 22 weaves through the slots 122 of the connector portion 118 in order to couple the strap 22 to the rear light assembly 18**.

Figure 9:
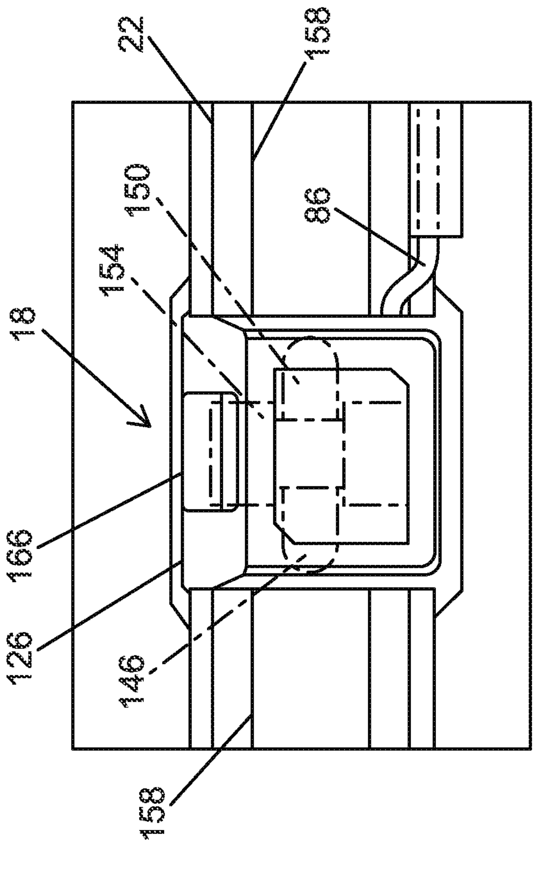
FIG. 9 is another view of the rear light assembly of FIG. 6.

The illustrated rear light assembly 18 also includes a second light housing or rear light housing 126 coupled to the connector portion 118 and having two side faces **142*a*, 142*b*. The rear light housing 126 at least partially encloses a rear light source, which in the illustrated embodiment includes a third light source 146 and a fourth light source 150 (FIG. 9). In some embodiments, the rear light housing 126 entirely encloses the rear light source. The third light source 146 and the fourth light source 150 may each be a single LED (e.g., a domed top LED) mounted to a single printed circuit board or PCB 154 and facing in opposite directions; however, the third and fourth light sources 146, 150 may include multiple LEDs and may be mounted or arranged in other ways. In the illustrated embodiment, the third and fourth light sources 146, 150 include red LEDs configured to emit red light. However, in alternative embodiments, the third and fourth light sources 146, 150 may emit different colored light (e.g., white light, green light, yellow light, etc.). In addition, the light sources 146, 150 may each emit the same color, or may emit different colors in some embodiments. The light emitted from the rear light assembly 18 may be the same as the color of the light sources 146, 150, or the rear light assembly 18** may include color-changing filters.

The rear light assembly 18 directs light emitted by the light sources 146, 150 through light pipes 158 extending from the side faces **142*a*, 142*b*. Specifically, the light pipes 158 direct light emitted by the third light source 146 through the first side face 142*a* and direct light emitted by the fourth light source 150 through the second side face 142***b*. In the illustrated embodiment, the light pipes 158 are at least partially made of optically-clear material (e.g., an optically-clear plastic such as polycarbonate, silicone, or acrylic) to transmit light from the respective light sources 146, 150 along the light pipes 158 with relatively low intensity loss along the lengths of the light pipes 158. In some embodiments, the light pipes 158 may include one or more optical fibers.

Referring to FIG. 2, the light pipes 158 extend out of the rear light housing 126 along the strap 22 and toward the front light assembly 14. The illustrated light pipes 158 are coupled to the strap 22 via couplers 180 (e.g., straps, loops, stitches, adhesives, or the like), which keep the light pipes 158 aligned with the curvature of the strap 22. In other embodiments, the light pipes 158 may integrated into the strap 22. In some embodiments, each of the light pipes 158 may extend from the rear light housing 126 at least 10% of the circumference of the strap 22. That is, the light pipes 158 may collectively extend along at least 20% of the circumference of the strap. In other embodiments, each of the light pipes 158 may extend along at least 12.5% of the circumference of the strap 22, such that the light pipes 158 may collectively extend along at least 25% of the circumference of the strap. In yet other embodiments, the light pipes 158 may collectively extend along 15% to 50% of the circumference of the strap 22, or greater than 50% of the circumference of the strap 22 in other embodiments. Thus, the light pipes 158 define an illumination element that may distribute light from the rear light assembly 18 over a relatively large portion of the strap 22, advantageously providing the user of the headlamp 10 with greater visibility to others in the vicinity.

Figure 6:
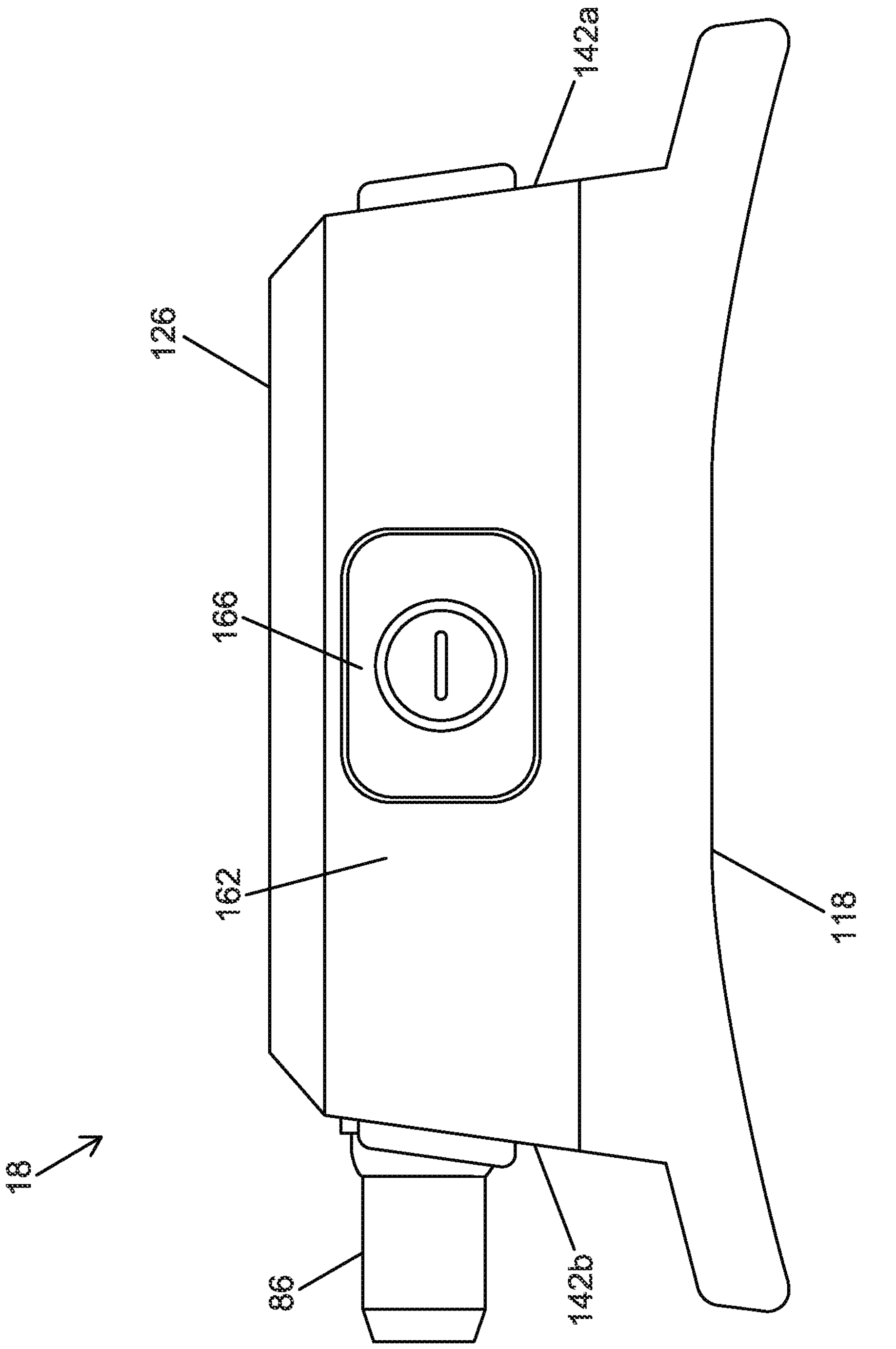
FIG. 6 is a top view of a rear light assembly of the headlamp of FIG. 1.

Referring to FIG. 6, the third and fourth light sources 146, 150 are controlled via a rear light assembly control panel 162 on the top face 138 of the rear light assembly 18. The rear light assembly control panel 162 is electrically connected to the third and fourth light sources 146, 150 to control the rear light assembly 18 (e.g., using an actuator 166). The rear light assembly control panel 162 advantageously allows the user to operate the third and fourth light sources 146, 150 separately from the first and second light sources 54, 58. The actuator 166 could be a button, switch, or any suitable control mechanism that is configured to control the rear light assembly 18. In the illustrated embodiments, the actuator 166 may be depressed to toggle the rear light assembly between three different operating modes: a first mode in which the third and fourth light sources 146, 150 are emitting light, a second mode in which the third and fourth light sources 146, 150 are emitting light in a predetermined pattern (e.g., a flashing pattern), and a third mode in which the third and fourth light sources 146, 150 are not emitting light. In alternative embodiments, the actuator 166 may toggle the rear light assembly 18 between other operating modes. In still further embodiments, the rear light assembly control panel 162 may additionally include a power actuator to separately control turning the light sources 146, 150 on and off (e.g., similar to the power actuator 66 described above). In some embodiments, the actuator 166 may send signals to the internal control unit in the front light assembly 14 (e.g., via the wire 86), which may then control operation of the rear light assembly 18. In other embodiments, the rear light assembly 18 may include a separate internal control unit.

During operation of the headlamp 10, the front light assembly 14 may be operated as a spot light and as a flood light by changing between different operating modes via the mode actuator 70. Power is provided from the battery 80 contained within the front light housing 26 to the first and second light sources 54, 58 as well as to the third and fourth light sources 146, 150 (via the wire 86). The user may separately control the illumination of the front and rear light assemblies 14, 18 via the first and second control panels 62, 162. As such, the user may change operating modes of the front and rear light assemblies 14, 18 separately and thus illuminate the front and rear light assemblies 14, 18 separately or concurrently. The rear light assembly 18 illuminates the light pipes 158 via the third and fourth light sources 146, 150. The light pipes 158 distribute the light from the third and fourth light sources 146, 150 at least partially around the strap 22 and produce a glowing effect to increase the visibility of the user from behind and from the sides. As opposed to diffusers, which are optically-opaque and scatter light over a wide angle, the light pipes 158 provide more consistent and uniform illumination along their entire lengths. The reflective portions 110 may provide additional visibility by reflecting light from the light sources 54, 58, 146, 150 and/or the environment.

Figure 11:
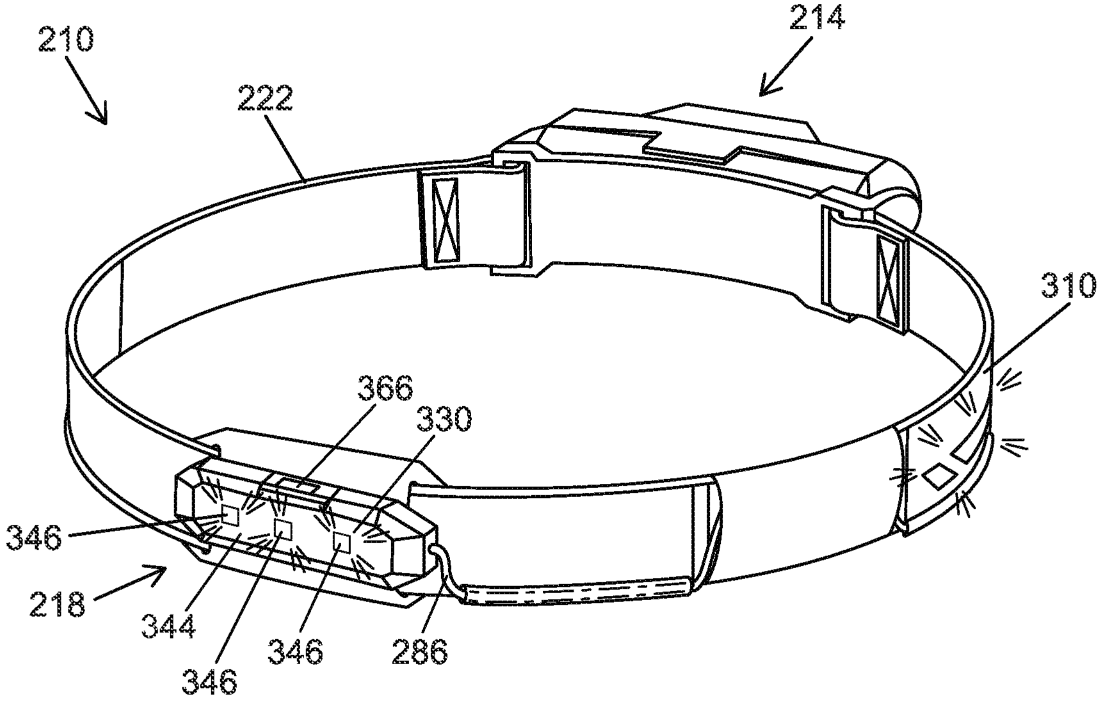
FIG. 11 is a perspective view of a headlamp according to another embodiment.
Figure 12:
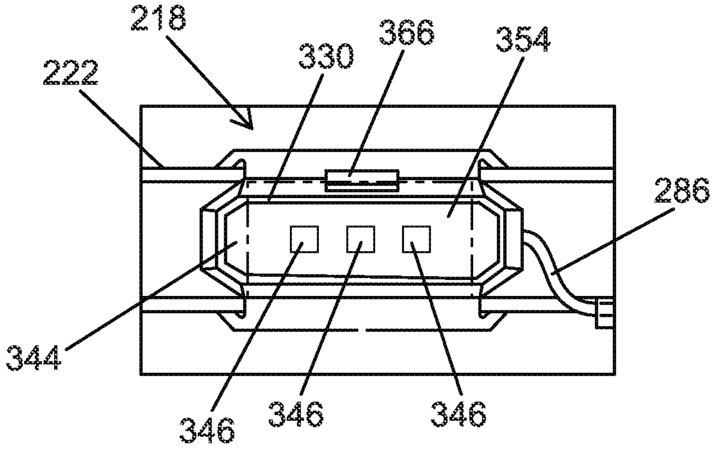
FIG. 12 illustrates a rear light assembly of the headlamp of FIG. 11.

FIGS. 11-12 illustrate a headlamp 210 according to another embodiment. The illustrated headlamp 210 is similar to the headlamp 10 described above with reference to FIGS. 1-10. Components that are similar to those described in the headlamp 10 have the same reference number plus "200." In addition, the following description focuses primarily on differences between the headlamp 210 and the headlamp 10.

The headlamp 210 includes a front light assembly 214, a strap 222, and a rear light assembly 218. A rearward face 330 of a rear light housing 326 supports a lens 344, and the rear light housing 326 and the lens 344 enclose a third light source 346. In the illustrated embodiment, the third light source 346 includes three LEDs positioned on a single circuit board 354. The rear light assembly 218 does not include light pipes in the illustrated embodiment. Rather, the lens 344 and, optionally, the rear light housing 326 may be partially opaque to diffuse light emitted from the third light source 346 to the surrounding area. In the illustrated embodiment, the third light source 346 emits red light. However, in alternative embodiments, the third light source 346 may emit different colored lights.

Figure 13:
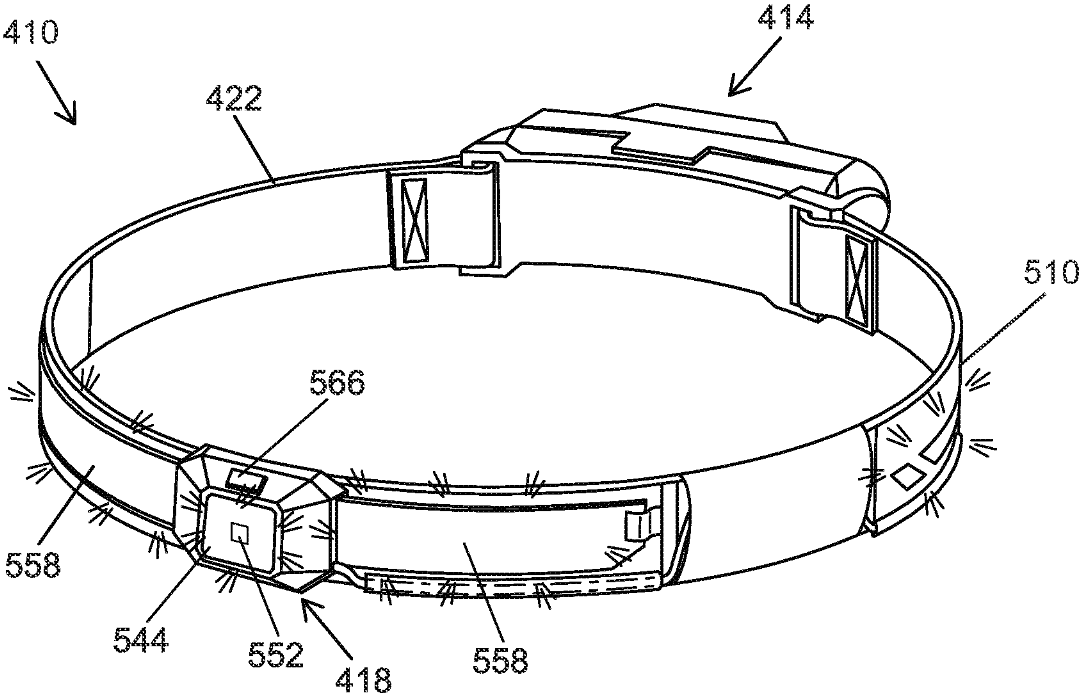
FIG. 13 is a perspective view of a headlamp according to another embodiment.
Figure 14:
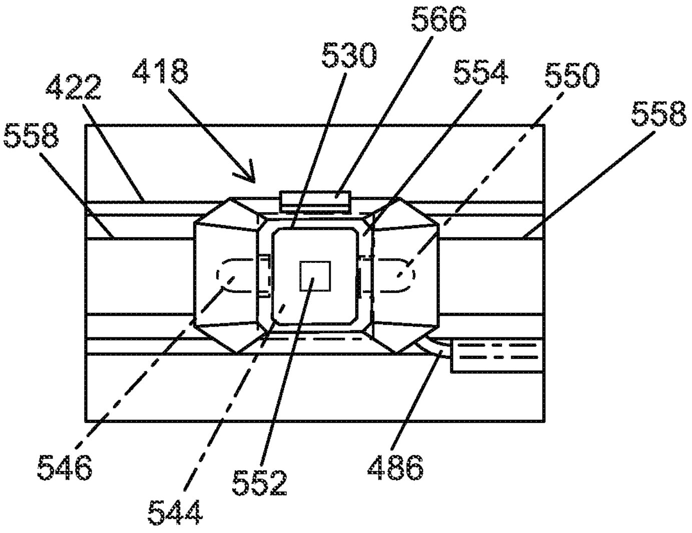
FIG. 14 illustrates a rear light assembly of the headlamp of FIG. 13.

FIGS. 13-14 illustrate a headlamp 410 according to another embodiment. The illustrated headlamp 410 is similar to the headlamp 10 described above with reference to FIGS. 1-10. Components that are similar to those described in the headlamp 10 have the same reference number plus "400." In addition, the following description focuses primarily on differences between the headlamp 410 and the headlamp 10.

The headlamp 410 includes a front light assembly 414, a strap 422, and a rear light assembly 418 opposite the front light assembly 414. A rearward face 530 of a rear light housing 526 supports a lens 544. The rear light housing 526 and the lens 544 enclose a third light source 546, a fourth light source 550, and a fifth light source 552.

In the illustrated embodiment, each of the light sources 546, 550, 552 includes a single LED, and the LEDs are mounted to a single circuit board 554. Specifically, the third light source 546 and fourth light source 550 include opposite-facing domed LEDs, and the fifth light sources 552 includes an LED oriented transverse to the third and fourth light sources 546, 550. In the illustrated embodiment, the light sources 546, 550, 552 all emit red light. However, in alternative embodiments, one or more of the light sources 546, 550, 552 may emit different colors of light. The rear light assembly 418 is configured to direct light emitted by the fifth light source 552 in a direction rearward of the user. The rear light assembly 418 additionally directs light emitting by the third and fourth light sources 546, 550 to light pipes 558 extending from the rear light housing 526 in the same manner as the light pipes 158 described above.

During operation of the headlamp 410, the user may operate the rear light assembly 418 independently of the front light assembly 414, and may select modes including, for example, a first mode that energizes only the fifth light source 552 to direct light rearward from the user, a second mode that energizes only the third and fourth light sources 546, 550 to illuminate the light pipes 558, and a third mode that energizes all of the third, fourth, and fifth light sources 546, 550, 552 to provide maximum illumination.

Figure 15:
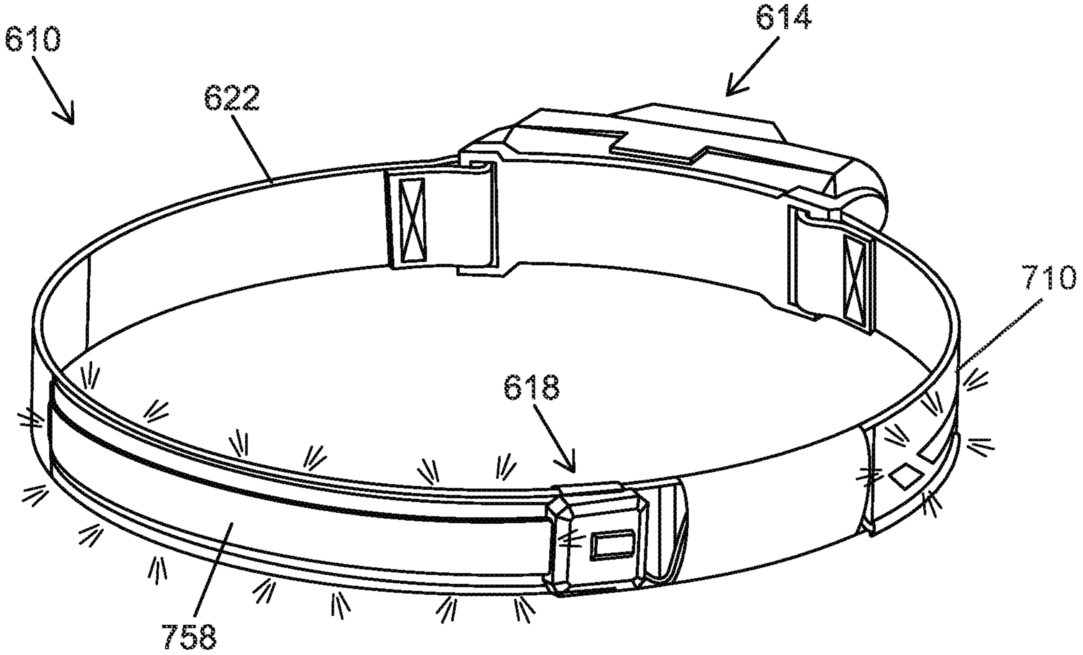
FIG. 15 is a perspective view of a headlamp according to another embodiment.
Figure 16:
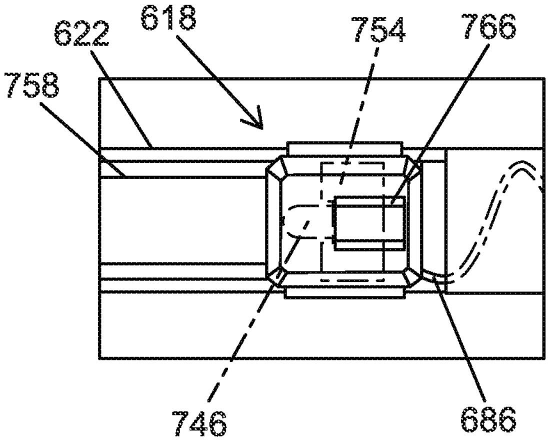
FIG. 16 illustrates a rear light assembly of the headlamp of FIG. 15.
Figure 17:
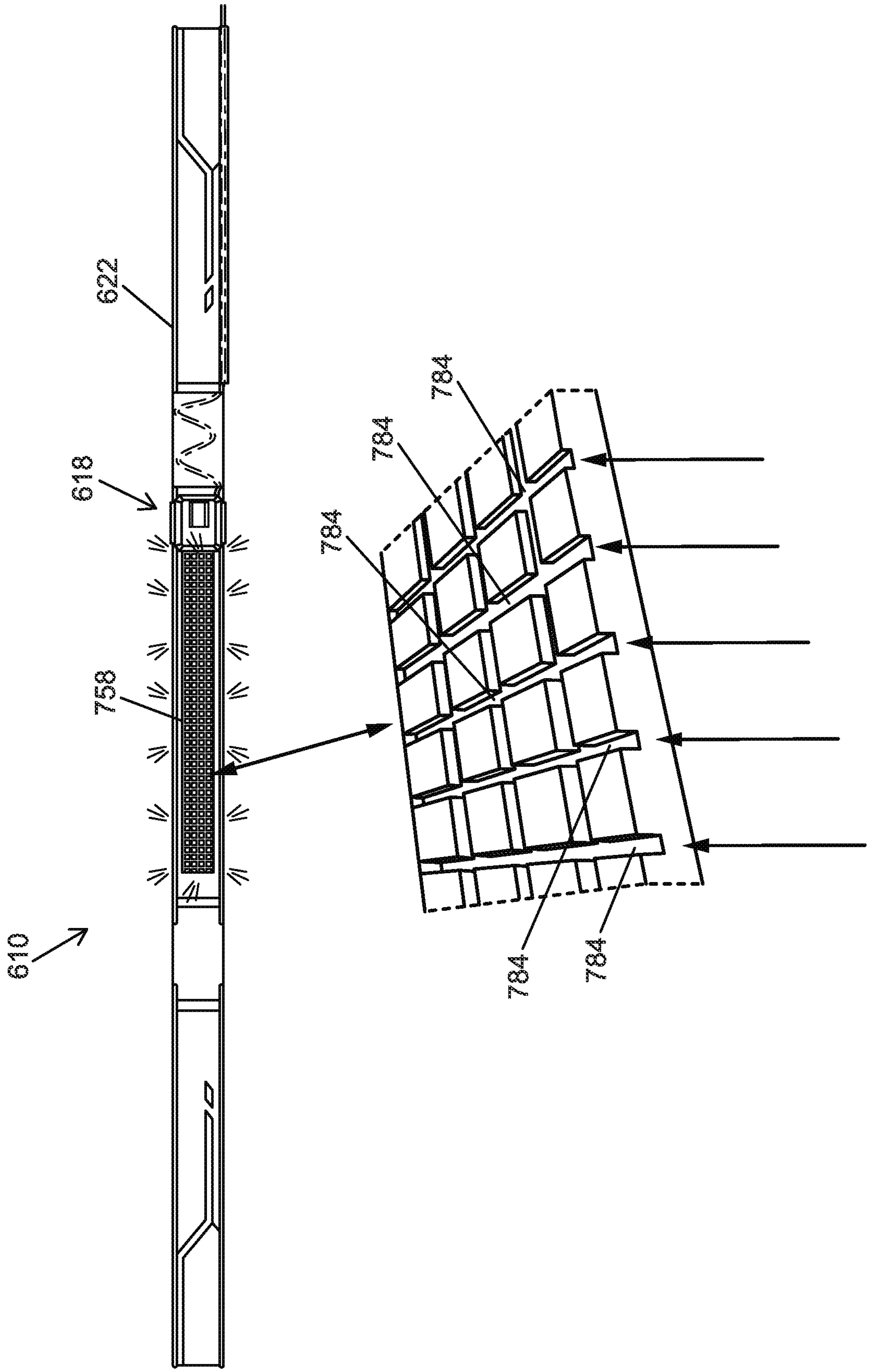
FIG. 17 illustrates details of a light pipe of the headlamp of FIG. 15.

FIGS. 15-17 illustrate a headlamp 610 according to another embodiment. The illustrated headlamp 610 is similar to the headlamp 10 described above with reference to FIGS. 1-10. Components that are similar to those described in the headlamp 10 have the same reference number plus "600." In addition, the following description focuses primarily on differences between the headlamp 610 and the headlamp 10.

The headlamp 610 includes a front light assembly 614, a strap 622, and a rear light assembly 618. Instead of being positioned directly opposite the front light assembly 614, the rear light assembly 618 in the illustrated embodiment is offset to one side. The rear light assembly 618 includes a rear light housing 726 that encloses a third light source 746. In the illustrated embodiment, the third light source 746 includes a domed top light emitting diode (LED) positioned on a circuit board 754. In the illustrated embodiment, the light source 746 emits red light. However, in alternative embodiments, the light source 746 may emit different colored light. The rear light assembly 618 directs light emitting by the third light source 746 to a single light pipe 758 extending in one direction from the rear light housing 726. In particular, the light pipe 758 extends out of the rear light housing 726 along the strap 622 in a direction toward the rear of the strap 622 opposite the front light assembly 614. The light pipe 758 evenly disperses light from and third light source 746 throughout the light pipe 758.

With reference to FIG. 17, in some embodiments, the inside of the light pipe 758 may be lined with a plurality of ridges 784. The ridges 784 located further from the light source 746 may be deeper than the ridges 784 closer to the light source 746. More specifically, the ridges 784 may gradually deepen when moving in a direction away from the light source 746. As light enters the light pipe 758, the light catches and reflects off of the ridges 784. Including deeper ridges further from the light source 746 provides more surface area for the light to reflect off of, increasing the reflection intensity as the overall intensity of light reaching the ridges is reduced due to increasing distance from the light source 746. Therefore, the varying ridge depth advantageously allows the light to be evenly dispersed throughout the length of the light pipe 758 and provides the light pipe 758 with an even glow during operation.

Various features of the invention are set forth in the following claims.

What is claimed is:

1. A headlamp comprising:
- a strap;
- a first lighting assembly coupled to the strap, the first lighting assembly including a first light housing enclosing a first LED;
- a reflective material coupled to the strap to enhance visibility of a user; and
- a second lighting assembly coupled to the strap, the second lighting assembly including a second LED;
- wherein the second lighting assembly follows a curvature of the strap,
- wherein the first lighting assembly and the second lighting assembly are operable independently of one another, and
- wherein the second lighting assembly extends along more than 20% of a circumference of the strap.

2. The headlamp of claim 1, wherein the reflective material is positioned adjacent the second lighting assembly to reflect light from the second LED.

3. The headlamp of claim 1, wherein the strap includes an elastic portion and an inelastic portion.

4. The headlamp of claim 3, wherein the reflective material is positioned on the inelastic portion.

5. The headlamp of claim 4, wherein the reflective material includes reflective tape.

6. The headlamp of claim 1, wherein the reflective material is disposed on an outer periphery of the strap.

7. The headlamp of claim 1, wherein the first lighting assembly includes a battery housing enclosing a battery, the battery configured to provide power to the first LED, and wherein the first lighting assembly also includes a first actuator for controlling operation of the first lighting assembly.

8. The headlamp of claim 7, wherein the second lighting assembly is electrically coupled to the first lighting assembly such that the battery is configured to provide power to the second LED.

9. The headlamp of claim 8, wherein the second lighting assembly includes a second actuator for controlling operation of the second lighting assembly independently from the first lighting assembly.

10. The headlamp of claim 8, further comprising a wire extending between the first lighting assembly and the second lighting assembly, the wire including coils to permit expansion and contraction of the wire.

11. The headlamp of claim 1, wherein the second lighting assembly is offset from the first lighting assembly by less than 180 degrees.

12. A headlamp comprising:
- a strap configured to be worn over a hard hat, the strap including an elastic portion and an inelastic portion;
- a bracket coupled to the strap;
- a first lighting assembly pivotally coupled to the bracket;
- a second lighting assembly coupled to the strap and spaced from the first lighting assembly; and
- a wire extending between the first lighting assembly and the second lighting assembly,
- wherein the second lighting assembly is coupled to the inelastic portion and follows a curvature of the strap.

13. The headlamp of claim 12, wherein the second lighting assembly is configured to distribute light at least partially around a circumference of the strap to increase visibility of a wearer of the headlamp from multiple directions.

14. The headlamp of claim 12, further comprising a reflective material disposed on an exterior side of the inelastic portion of the strap.

15. The headlamp of claim 12, wherein the wire includes coils adjacent the elastic portion of the strap to permit expansion and contraction of the wire.

16. A headlamp comprising:
- a strap;

a first lighting assembly coupled to the strap, the first lighting assembly including a first light housing enclosing a first LED;

a reflective material coupled to the strap to enhance visibility of a user; and a second lighting assembly coupled to the strap, the second lighting assembly including a second LED;

wherein the second lighting assembly follows a curvature of the strap, wherein the first lighting assembly and the second lighting assembly are operable independently of one another, and wherein the strap includes an elastic portion and an inelastic portion.

17. The headlamp of claim 16, wherein the reflective material is positioned on the inelastic portion.

18. The headlamp of claim 17, wherein the reflective material includes reflective tape.

* * * * *